Oct. 24, 1961

T. E. JENKINS 3,005,596

WASTE DISPOSAL APPARATUS

Filed May 31, 1960

INVENTOR.
THOMAS E. JENKINS

BY

HIS ATTORNEY

Oct. 24, 1961

T. E. JENKINS 3,005,596

WASTE DISPOSAL APPARATUS

Filed May 31, 1960

INVENTOR.
THOMAS E. JENKINS

BY *Sheridan W. Briggs*

HIS ATTORNEY

Oct. 24, 1961 T. E. JENKINS 3,005,596
WASTE DISPOSAL APPARATUS
Filed May 31, 1960 3 Sheets-Sheet 3

INVENTOR.
THOMAS E. JENKINS
BY
HIS ATTORNEY

United States Patent Office 3,005,596
Patented Oct. 24, 1961

3,005,596
WASTE DISPOSAL APPARATUS
Thomas E. Jenkins, Louisville, Ky., assignor to General Electric Company, a corporation of New York
Filed May 31, 1960, Ser. No. 33,001
5 Claims. (Cl. 241—46)

This application is a continuation-in-part of my application Serial Number 771,001 filed October 31, 1958, and now abandoned, which is assigned to the General Electric Company, the assignee of this application.

This invention relates to food waste disposal apparatus, and it has as its principal object the provision of an improved grinding mechanism in apparatus of this type which is particularly effective in comminuting fibers and other long stringy material in that it will comminute such materials at a faster rate and to a finer degree than will waste disposal apparatus heretofore known, and which apparatus is particularly effective in avoiding jamming of the mechanism by small bone chips and other similar foreign objects.

This invention is especially applicable to waste food disposal apparatus of the kind having a stationary shredding or grinding ring within which there is a rotary flywheel or grinder arranged to grind or comminute the waste material between the ring and flywheel when the flywheel is rotated. In this type of apparatus the food waste is ground or shredded in the presence of water supplied for example from a kitchen sink to which the apparatus is connected, and the mixture of ground garbage and water is flushed from the apparatus to the house drain; the drain is connected below the flywheel and shredder, and the shredder and at times the flywheel has openings to provide for the flow of the waste material to the drain.

One of the problems encountered in the design and operation of waste food disposal apparatus of this kind is that at times fibrous material such as corn husks, celery, bean pods, artichokes and the like pass into the drain with their fibers practically intact with the result that the drain line may become obstructed. Another problem is that such fibrous materials, and small bone chips and like particles may become packed or wedged into the clearance space between the flywheel and the stationary shredding member by the flow of waste fluid between these members, particularly when the apparatus is stopped before the grinding operation is completed in a normal grinding operation. This jamming at times is sufficiently compact to prevent starting of the apparatus for a subsequent operation.

This invention contemplates the provision of an improved flywheel and grinding structure which will insure the retention of fibrous material from passing into the drain, or stated differently for retaining it in the grinding apparatus until it is ground up, and arranging the flywheel and shredding ring so that packing of small particles with resultant jamming is avoided.

Further objects and advantages of the invention will become apparent as the following description proceeds and the features of novelty which characterize the invention will be pointed out with particularity in the claims annexed to and forming a part of this specification.

Briefly stated, in accordance with one aspect of this invention I provide a generally cylindrical stationary shredding member having apertures therein through which comminuted material may be expelled, an annular substantially horizontal shelf member extending inwardly from the lower edge of the wall member, a rotary comminuting member having a cylindrical peripheral surface concentric with the inner edge of the shelf member and in close proximity thereto, whereby an annular ledge or shelf lying radially outwardly from the annular clearance between the rotary and stationary comminuting members is provided. Thus, the annular clearance space between the flywheel and the shredding member is spaced inwardly from the shredding means by the shelf; that is, it is spaced inwardly from the high pressure grinding area adjacent the shredding means, so that the shelf functions to retain fibrous material until it is reduced to lengths sufficiently short to pass through the apertures in the shredding member. Moreover small bone particles and the like residue are retained by the shelf away from the annular clearance space at the time the apparatus is stopped so that wedging of such parts in the clearance space with possible resulting jamming of the flywheel is avoided.

For a better understanding of the invention, reference may be made to the following description and the accompanying drawings in which.

Figure 1:
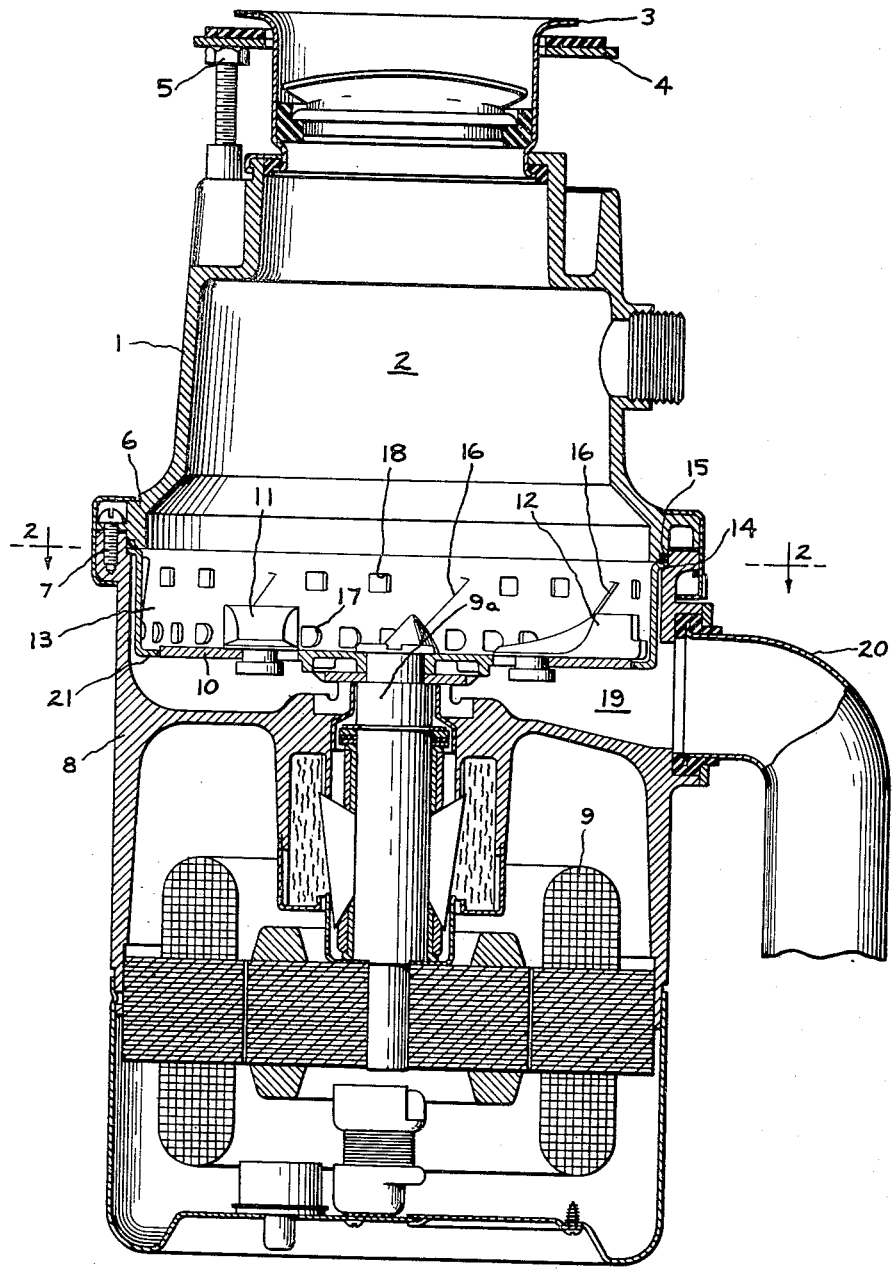
FIGURE 1 is an elevation view, partly in section, of one embodiment of a waste disposal device incorporating the present invention.
Figure 2:
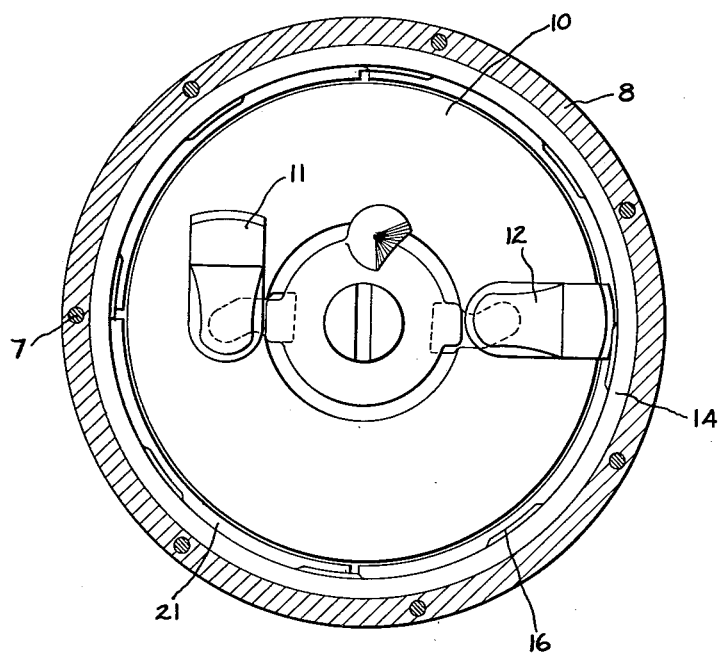
FIGURE 2 is a sectional plan view taken along the line 2—2 of FIGURE 1.
Figure 3:
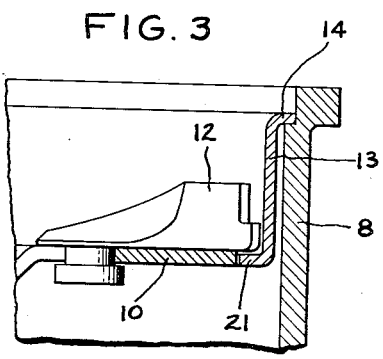
FIGURE 3 is an enlarged fragmentary view, in section, of certain of the parts shown in FIGURE 1.

Referring to FIGURES 1 through 3, I have shown my invention in one form as applied to a waste disposal device having a generally cylindrical tubular casing or hopper 1 enclosing a grinding or shredding chamber 2 at the bottom of which the comminuting and shredding of waste material takes place, as will be described below. The upper end of hopper 1 is provided with means suitable for supporting the device in the drain opening of a sink or the like, the supporting means including a supporting flange 3, a clamping flange 4 and clamping bolts 5, all arranged so that the open top of hopper 1 may be supported in alignment with a sink drain opening. Preferably, the drain opening is equipped with a suitable drain stopper, such as that disclosed in Patent No. 2,787,423 granted April 2, 1957, to Fred W. Moore and assigned to the General Electric Company, the assignee of the present application.

The lower end of hopper 1 is provided with a flange 6 which carries mounting screws 7 for securing a motor housing 8 to the hopper so as to form an integral structure. Mounted within motor housing 8 is an electric motor 9 provided with a vertically extending shaft 9a to which is fixedly secured rotary comminuting means located at the bottom of chamber 2. In the illustrated embodiment of the invention the rotary comminuting means comprises a generally flat circular flywheel 10 which carries a pair of movable impellers 11 and 12.

Secured at the bottom of tubular hopper 1 so as to cooperate with flywheel 10 and its impellers 11 and 12 is a generally cylindrical shredding ring 13. A flange 14 at the top of shredding ring 13 is secured between flange 6 of the hopper and the upper end of motor housing 8 so that the shredding ring is stationary with respect to the hopper and sealed by a resilient gasket 15 between flange 14 and the hopper structure. Shredding ring 13 is provided with a plurality of shredding projections 16 on its inner surface, a plurality of apertures 17 through which comminuted material is expelled during grinding operations, and a row of apertures 18 arranged to drain excess water from the comminuting zone. Projections 16, apertures 17 and apertures 18 may be conveniently formed by lancing and stamping operations or by any other suitable means. The arrangement and function of shredding ring 13 are more fully described and claimed in Patent No. 2,828,083 granted March 25, 1958, to Herbert J. Macemon and assigned to the assignee of the present application. From the foregoing it will be evident that during operation of the device shown in the drawing, waste material deposited in comminuting chamber 2 will be rotated by flywheel 10 and impelled against shredding projections 16 by impellers 11 and 12, and that the particles of comminuted material will be expelled through apertures 17 into drainage chamber 19 located below shredding ring 13 and flywheel 10, and will finally be carried by the flow of water through the device and out through a drain conduit 20.

As discussed previously, one of the problems which has been encountered in the design and operation of waste disposal apparatus of the general type described above is that fibrous material such as corn husks, pea pods, artichokes and celery sometimes passes from the comminuting chamber into the drainage chamber practically intact and may later mat together to obstruct the drain line to which the device is connected. It has been found that such material generally passes through the clearance between the rotary grinding member and the stationary wall surrounding the grind member and hence it is important that some means be provided for preventing passage of such material through the flywheel clearance. Also as pointed out above, at times small bone particles and like parts may cause jamming of the rotary member by becoming packed in the clearance between the rotary and stationary grinding members.

In accordance with the present invention, I overcome these difficulties by providing an annular substantially horizontal shelf member or ledge 21 extending inwardly on the lower edge of cylindrical shredding ring 13 and further, by arranging circular flywheel 10 with respect thereto so that the peripheral surface of the flywheel is concentric with and in close proximity to the inner edge of the shelf member. Thus it will be seen that the running clearance between the mating surfaces of flywheel 10 and shelf member 21 is spaced radially inwardly from the vertical side wall formed by the shredding ring 13, and that waste material thrown radially outwardly during grinding operations passes beyond the clearance and is retained on the ledge formed by shelf member 21. The waste material in this zone of the comminuting chamber is then acted upon by the freely swinging ends of impellers 11 and 12 so that eventually it is reduced to short lengths or otherwise reduced in size so that it can pass freely through apertures 17.

Preferably, the clearance between flywheel 10 and shelf 21 is maintained as small as reasonably possible (i.e., 0.035–0.040 inch). Also, it is desirable that the inner edge of shelf 21 have a cylindrical inner surface, as best shown in FIGS. 2 and 3, and that the peripheral surface of flywheel 10 be generally cylindrical and concentric with the cylindrical inner surface of the shelf member. It is also preferable that the impellers 11 and 12 include swinging end portions which extend outwardly over shelf member 21 when the impellers are in their radially extending positions so that the impeller end portions may cooperate with shredding ring 13 in grinding and cutting fibers and other waste food particles retained on shelf 21. With regard to the relative positions of the top surfaces of flywheel 10 and shelf 21, flywheel 10 is preferably positioned so that its top surface is somewhat higher than the top surface of shelf member 21, as shown in FIG. 3. Thus waste materials sliding along the top surface of flywheel 10 during grinding operations can freely pass over the running clearance of the flywheel and onto the top surface of shelf member 21. The shelf also retains small bone particles and like waste material from flowing into the clearance space between the flywheel and the stationary shredding member so as to avoid the packing and jamming of the flywheel.

Aside from its material retaining function just described one of the most important results of the shelf structure is that the mating juncture edges between the flywheel and the shredding ring are removed inwardly away from the high pressure grinding area which is located adjacent the stationary cutters 16 by the coaction of these cutters and the impellers 11 and 12. In other words, the clearance space between the flywheel and shredding ring is in a low pressure area with the result that fibers are not forced into it, thereby avoiding fibers jamming and course discharge. Thus, I am enabled to use two mating smooth circular cylinder surfaces on the flywheel and shredding ring shelf and yet avoid the jamming of foreign objects and chips in the space.

Figure 4:
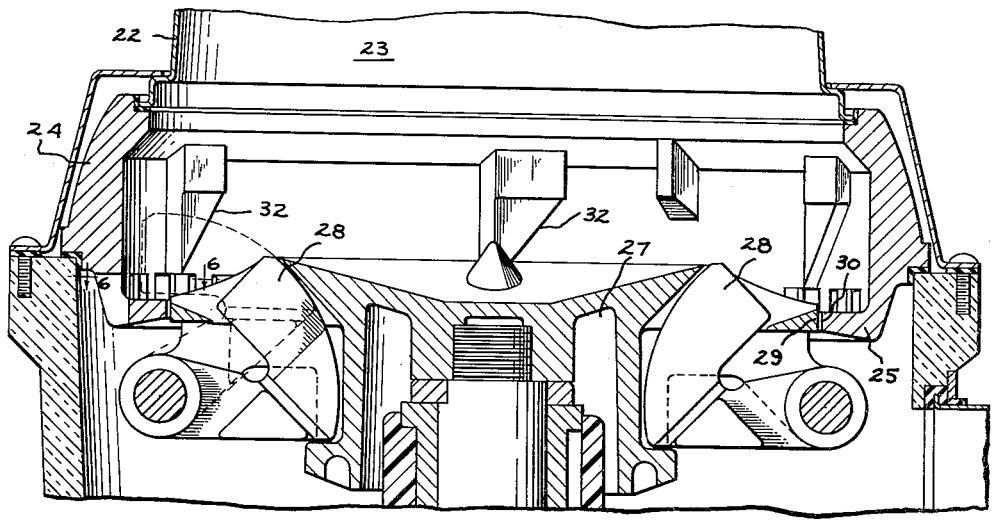
FIGURE 4 is a fragmentary sectional view comparable to FIGURE 1 and showing another embodiment of this invention.
Figure 5:
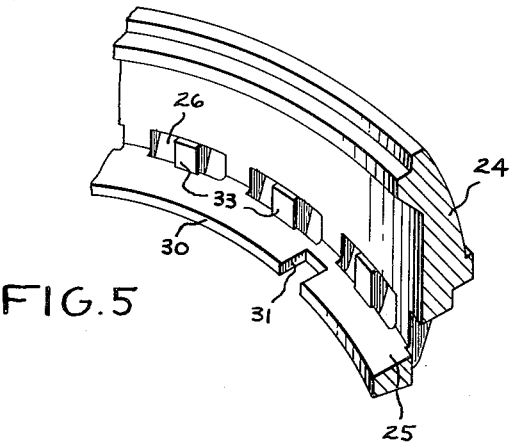
FIGURE 5 is a fragmentary perspective view of stationary grinding means used in the apparatus of FIGURE 4.
Figure 6:
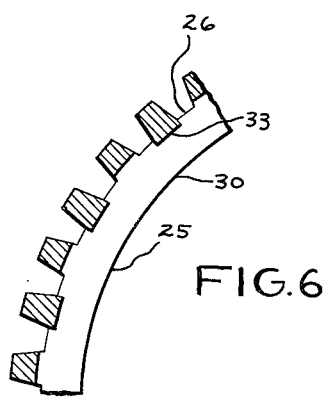
FIGURE 6 is a fragmentary cross-sectional plan view taken on the line 6—6 of FIGURE 4.

In FIGURES 4, 5 and 6 I have shown another form of this invention. This form like the form shown in FIGURES 1 through 3 has a casing 22 defining a grinding chamber 23 and which is attached at its top to a sink (not shown) in any suitable way as by the means shown in FIGURE 1. Arranged within the grinding chamber is a stationary shredding ring 24. This ring, as is the ring 13, is arranged in the lower part of the grinding chamber and like ring 13 is provided at its lower edge with a horizontally inwardly extending annular shelf 25, and with a series of drain openings 26 positioned around the ring above the shelf 25, as shown. Within the central opening of the shelf is a flywheel 27 rotatable in the central longitudinal axis of the grinding chamber. This flywheel has impellers 28 arranged to fly outwardly to overlie the peripheral area of the flywheel and the shelf 25 when the flywheel is rotated. These impellers in this case are mounted to rotate on horizontal axes and are arranged to move to their extended position by centrifugal force when the flywheel is rotated. The flywheel, as in the first form, has a peripheral cylindrical surface 29 which has a close running clearance with the mating cylindrical surface 30 provided on the shelf.

The shelf 25 in this embodiment is provided with a few widely spaced notches 31 opening through the surface 30 into the space between surfaces 29 and 30, and positioned in the shelf below the path of movement of the impellers 27 when they are extended by the rotating flywheel. These notches perform the important function of providing more effective comminution of fibrous materials, more effective in the sense of providing a faster grinding action, and a finer grind. In this form of the invention, in contradistinction to the first form I specificaly design the apparatus so that some of the fibrous material will be forced by the pressure of the cutting action created by the impellers 28 coacting with the shredding ring into the annular clearance space or gap between the flywheel and the shredding ring in order to increase the speed of grinding and to effect a finer grind of fibers. I control the degree or extent of this action by controlling the shelf width; if the shelf width is made great enough I will prevent any fibrous material from being forced into this annular space by the grinding pressure. In this form of the invention, however, I decrease the width somewhat below this width so as to provide for some flow of the fibrous material into the clearance space. The portions of the fibrous material which are thus forced into the clearance space help to hold the entire fibrous mass above the shelf 30 with which the upper ends of these fibers are entangled down onto the shelf in the cutting area. This provides for a more rapid and effective grinding action of the fibers. I avoid jamming of the fibers within the clearance space by the provision of the notches 31 which provides spaced open areas into which the fibers may fall free from the shelf and the flywheel as the flywheel rotates.

While rectangular notches 31 have been shown notches of other shapes such as arc-shape notches may be used. It is important, however, that each of the two dimensions of each notch—its width and depth—be greater than the thickness of the shelf.

Only a relatively few (four in the embodiment shown) notches should be used and they should be widely spaced apart. Should it be attempted to use a large number of closely positioned notches it will be found that masses of fibers may pass down into the drain and cause clogging.

The specific structure of the shredding ring 24 with its plurality of main shredding pads 32 and secondary pads 33 between some of the drainage openings 26 and the relation of the ring to the grinding wheel 27, and the specific structure of the wheel 27 and its arrangement of impellers 28 are not claimed in this application, but constitute the subject matter of co-pending application Serial Number 32,800 filed concurrently herewith, and assigned to the General Electric Company, the assignee of this application.

While I have shown and described specific embodiments of my invention, I do not desire the invention to be limited to the particular constructions shown and described and I intend by the appended claims to cover all modifications within the true spirit and scope of my invention.

What I claim as new and desire to secure by Letters Patent of the United States is:

1. Waste disposal apparatus comprising a generally vertically extending casing enclosing a comminuting chamber, said casing having a top access opening for water and waste material, a generally vertically extending cylindrical wall member located at the bottom of said chamber having a plurality of apertures therein through which comminuted waste material may be expelled from said chamber, stationary shredding means within the lower portion of said chamber inwardly of said cylindrical wall member, an annular substantially horizontal shelf member below said apertures extending inwardly from said cylindrical wall member and terminating at its inner edge in a circular opening which lies inwardly from said stationary shredding means, rotary shredding means within the lower portion of said chamber for impelling waste material against said shredding means and for expelling waste material through said apertures, said rotary means including a circular flywheel closing the bottom of said cylindrical wall member and having a peripheral circular edge concentric with said inner edge of said shelf member and in close running proximity thereto to form a clearance gap that is spaced inwardly from the cylindrical wall member by the width of the shelf member to remove the gap from the high pressure grinding area, and said rotary means also including an impeller to overlie parts of said flywheel and said shelf to impel waste material deposited in said cylindrical wall onto said flywheel outwardly to said shelf where it is retained for comminution by engagement with said stationary shredding means and then projected outwardly through said apertures, and wall means below said cylindrical wall defining a drainage chamber communicating with said comminuting chamber through said apertures.

2. Waste disposal apparatus comprising a generally vertically extending casing enclosing a comminuting chamber, said casing having a top access opening for water and waste material, a generally vertically extending cylindrical wall member located at the bottom of said chamber having a plurality of apertures therein through which comminuted waste material may be expelled from said chamber, stationary shredding means within the lower portion of said chamber inwardly of said cylindrical wall member, an annular substantially horizontal shelf member extending inwardly from the lower edge of said cylindrical wall member and said stationary shredding means and terminating in a central opening defined by a generally vertically extending cylindrical surface, a circular flywheel within said opening having a peripheral cylindrical surface concentric with and in relatively close running proximity with said cylindrical surface on said shelf member to form a clearance gap that is spaced inwardly from the cylindrical wall member by the width of the shelf member to remove the gap from the high pressure grinding area, the top surface of said flywheel being positioned somewhat higher than the top surface of said shelf member, an impeller pivotally mounted to said flywheel for pivotal movement radially outwardly when the flywheel is rotated to overlie a part of said flywheel and to extend over said top surface of said shelf member, said impeller operating when the flywheel is rotated to impel waste material from said flywheel to said shelf member where it is retained for comminution by engagement with said stationary shredding means and to discharge the comminuted material through said openings, and wall means below said cylindrical wall member defining a drainage chamber communicating with said comminuting chamber through said apertures.

3. Waste disposal apparatus comprising a generally cylindrical vertically extending wall member located at the bottom of a comminuting chamber and having a top access opening for water and waste material, said wall member having a plurality of apertures therein through which comminuted waste material may be expelled from the lower portion of said chamber, stationary shredding means within the lower portion of said chamber, an annular substantially horizontal shelf member below the apertures extending inwardly from the lower edge of said cylindrical wall member, said shelf member having a cylindrical inner surface on its inner edge, rotary means within the lower portion of said chamber for impelling waste material against said shredding means and for expelling waste material through said apertures, said rotary means including a circular flywheel lying in the same general horizontal plane as the shelf and having a peripheral cylindrical surface concentric with the cylindrical inner surface on said shelf member and in close proximity thereto to form a clearance gap that is spaced inwardly from the cylindrical wall member by the width of the shelf member to remove the gap from the high pressure grinding area, the top surface of said shelf member being positioned below the top surface of the peripheral portion of said flywheel, an impeller pivotally mounted on said flywheel for pivotal movement about an axis generally parallel to the axis of rotation of said flywheel, said impeller including a swinging end portion extending outwardly over said shelf member when the impeller is in a radially extending position, and wall means below said cylindrical wall member defining a drainage chamber communicating with said comminuting chamber through said apertures.

4. Waste disposal apparatus comprising a generally vertically extending casing enclosing a comminuting chamber, said casing having a top access opening for water and waste material, a generally vertically extending cylindrical wall member located at the bottom of said chamber having a plurality of apertures therein through which comminuted waste material may be expelled from said chamber, stationary shredding means within the lower portion of said chamber inwardly of said cylindrical wall member, an annular substantially horizontal shelf member below said apertures extending inwardly from said cylindrical wall member and terminating at its inner edge in a circular opening which lies inwardly from said stationary shredding means, rotary shredding means within the lower portion of said chamber for impelling waste material against said shredding means and for expelling waste material through said apertures, said rotary means including a circular flywheel closing the bottom of said cylindrical wall member and having a peripheral circular edge concentric with said inner edge of said shelf member and in close running proximity thereto to form a clearance gap that is spaced inwardly from the cylindrical wall member by the width of the shelf member to remove the gap from the high pressure grinding area, and said rotary means also including an impeller to overlie parts of said flywheel and said shelf to impel waste material deposited in said cylindrical wall onto said flywheel outwardly to said shelf where it is retained for comminution by engagement with said stationary shredding means and then projected outwardly, said shelf being provided with a relatively few widely spaced apart notches opening through said inner edge into the gap between said shelf member and said flywheel, and wall means below said said cylindrical wall defining a drainage chamber communicating with said comminuting chamber through said apertures.

5. Waste disposal apparatus as defined in claim 4 in which said notches have a depth and a width each greater than the vertical thickness of said shelf member.

References Cited in the file of this patent

UNITED STATES PATENTS

| | | |
|---|---|---|
| 2,760,730 | Jordan | Aug. 28, 1956 |
| 2,828,083 | Macemon | Mar. 25, 1958 |
| 2,838,245 | Macemon | June 10, 1958 |